March 23, 1948.   S. H. EDWARDS   2,438,432
TORSION SPRING MOUNTING
Filed Oct. 5, 1945
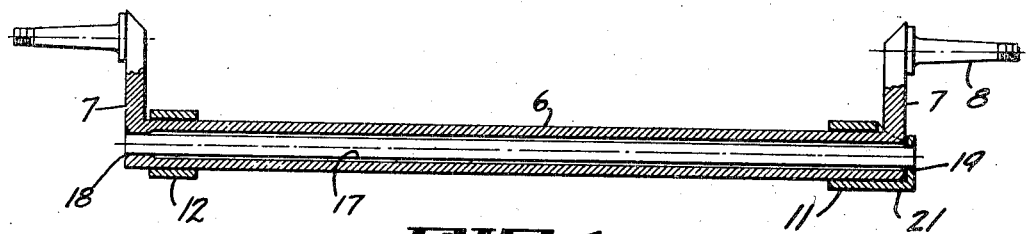
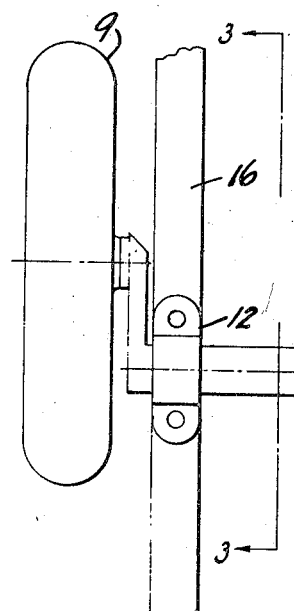
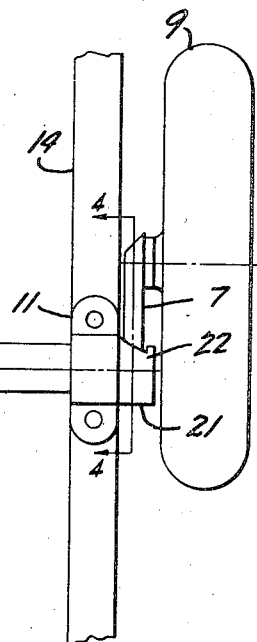
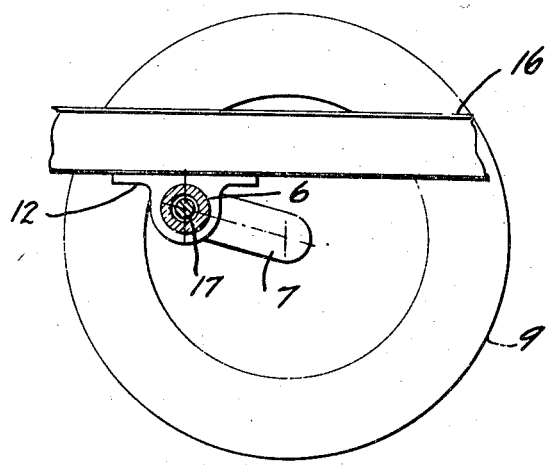
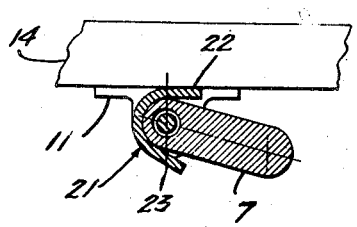
INVENTOR.
S. H. EDWARDS
BY
Robert N. Berkhoff
ATTORNEY Patented Mar. 23, 1948

2,438,432

UNITED STATES PATENT OFFICE 2,438,432

TORSION SPRING MOUNTING

Samuel H. Edwards, Richmond, Calif.

Application October 5, 1945, Serial No. 620,437

2 Claims. (Cl. 267—57)

This invention relates to a spring construction useful in the mounting of wheels upon a vehicle.

Torsion spring mountings have been heretofore employed upon vehicles. Generally, these have been complex, involved structures.

In accordance with the present invention, I provide an improved torsion spring mounting for vehicle wheels in which a rod provides a spring mount for both wheels, the rod being secured at both ends whereby, when it acts as a spring, it is uniformly stressed throughout its length thereby ensuring that the life and action of the rod are respectively prolonged and uniform.

It is the generally broad object of the present invention to provide an improved swinging arrangement in which a torsion spring bar is utilized and is uniformly stressed throughout its length.

Another object of the present invention is to provide a novel wheel mounting of a simple character which can be readily manufactured at relatively low cost.

The invention includes other objects and features of advantage, some of which, together with the foregoing will appear hereinafter wherein the present preferred form of spring mounting of this invention is disclosed.

Referring to the drawings accompanying and forming a part of this specification, Figure 1 is a plan view, partially in section through a wheel mount including the torsion spring of the present invention.

Figure 2 is a plan view showing the installation of the spring mount of Figure 1 in place upon a vehicle frame.

Figures 3 and 4 are respectively sections taken along the line 3—3 and 4—4 in Figure 2.

Referring to the drawings, the improved wheel mount of this invention includes a tubular axle 6. Arms 7 are mounted upon each end of the tubular axle and upon the ends of these arms are placed suitable spindles 8 for mounting of wheels or other road engaging means 9. The tubular axle is mounted in suitable bearings 11 and 12 upon some portion of the frame of the vehicle. In the present structure, I have shown bearings 11 and 12 as mounted upon frame members 14 and 16.

To provide the torsion spring mounting, a torsion bar of a suitable resilient, tough metal is mounted in the hollow axle 6, numeral 17 being applied to this. At one end the bar 17 is joined to an end of the hollow axle 6 as by welding 18. At the other end of the tubular axle, the bar 17 is joined as by welding 19 to an extension 21 on bearing 11. Thus, rod 17 is fixed at one end to the tubular axle and, in effect, at its other end to a fixed portion of the frame of the vehicle. Arms 7, upon movement relative to the frame, must twist rod 17. Since the rod is engaged at each end, it is uniformly stressed throughout its length and thus is ensured of long life and uniform resilience.

Extension 21 on bearing 11 is preferably fashioned so that it provides a limit for extreme movement of the cooperatively positioned arm 7, the extension being provided with portions 22 and 23 thereon extending in the direction but spaced from the cooperating arm 7. If arm 7 moves upwardly, it will strike the upper extension 22, while if it moves downwardly too far, it will strike the lower extension 23.

From the foregoing, I believe it will be apparent that I have provided a novel and an improved vehicle wheel spring mounting.

I claim:

1. A spring mounting for a wheel supported axle consisting of a frame, a tubular axle having an offset wheel mount on each end thereof for mounting a wheel, bearings fixed on said frame for mounting said axle for rotation on said frame, and a rod extending through said tubular axle and secured at one end to an end of said axle and at its other end to one of said bearings on said frame to fix said rod in position as a torsion spring member.

2. A spring mounting for a wheel supported axle; said mounting consisting of a U-shaped axle member having a tubular intermediate axle portion carrying opposite parallel legs at the ends thereof; a wheel mount projecting outwardly from each leg of said U-shaped axle member; a vehicle frame having opposite spaced substantially parallel frame members; an axle bearing on each frame member; that portion of the U-shaped axle member between said legs being mounted for rotation in said axle bearings; and a solid rod extending through said tubular intermediate axle portion of said axle member and having one end thereof directly secured to the tubular intermediate axle portion at one end thereof and having its other end fixed with respect to said frame.

SAMUEL H. EDWARDS.

REFERENCES CITED

The following references are of record in the file of this patent:

UNITED STATES PATENTS

| Number | Name | Date |
|---|---|---|
| 2,016,753 | Petzig | Oct. 5, 1935 |
| 2,227,762 | Ronning | Jan. 7, 1941 |

FOREIGN PATENTS

| Number | Country | Date |
|---|---|---|
| 149,718 | Great Britain | Aug. 26, 1920 |
| 620,805 | Germany | Oct. 28, 1935 |